US011011898B2

(12) United States Patent
Diakomis et al.

(10) Patent No.: US 11,011,898 B2
(45) Date of Patent: May 18, 2021

(54) RECESSED FLOOR FITTING AND COVERS THEREFORE

(71) Applicant: Hubbell Incorporated, Shelton, CT (US)

(72) Inventors: Athanasios Diakomis, Seymour, CT (US); Joseph Cretella, Ansonia, CT (US); Sorin Mortun, Irvington, NY (US); Matthew Lawson, Oxford, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/519,541

(22) Filed: Jul. 23, 2019

(65) Prior Publication Data

US 2020/0036174 A1 Jan. 30, 2020

Related U.S. Application Data

(60) Provisional application No. 62/711,867, filed on Jul. 30, 2018.

(51) Int. Cl.
*H02G 3/08* (2006.01)
*H02G 3/12* (2006.01)
(Continued)

(52) U.S. Cl.
CPC .............. *H02G 3/083* (2013.01); *H02G 3/12* (2013.01); *H02G 3/14* (2013.01); *H02G 3/16* (2013.01)

(58) Field of Classification Search
CPC ............ H02G 3/083; H02G 3/12; H02G 3/14; H02G 3/16; H02G 3/185; H02G 3/088;
(Continued)

(56) References Cited

U.S. PATENT DOCUMENTS 4,336,416 A * 6/1982 Goodsell ................. H02G 3/22
169/48
5,803,797 A * 9/1998 Piper ....................... B24B 37/30
125/12
(Continued)

FOREIGN PATENT DOCUMENTS

CN 207381811 U * 5/2018
WO WO-2017147489 A1 * 8/2017 ............. H02G 3/185

OTHER PUBLICATIONS

PCT/US2019/042961 International Search Report and Written Opinion dated Nov. 15, 2019 (16 pages).

*Primary Examiner* — Timothy J Thompson
*Assistant Examiner* — Guillermo J Egoavil
(74) *Attorney, Agent, or Firm* — Michael Best & Friedrich, LLP

(57) ABSTRACT

A recessed floor fitting includes a poke-through housing, a divider assembly, and a feeder plate. The poke-through housing has a base and an outer wall with an open top that defines an interior chamber. The base includes a central aperture, a first perimeter aperture, and a second perimeter aperture. The divider assembly separates the interior chamber into a center portion, a first portion, and a second portion. The center portion is in communication with the center aperture. The first and second portions are in communication with the respective first and second perimeter apertures. The feeder plate is connected to the base, and has a mounting flange and a conduit extending from the mounting flange.

19 Claims, 14 Drawing Sheets

(51) Int. Cl.
*H02G 3/14* (2006.01)
*H02G 3/16* (2006.01)

(58) Field of Classification Search
CPC ........ H02G 3/08; H02G 3/0412; H02G 3/085; H02G 3/283; H02G 3/285; H02G 15/10
USPC .................... 174/559, 483, 480, 481, 482
See application file for complete search history.

(56) References Cited

U.S. PATENT DOCUMENTS

| | | | | |
|---|---|---|---|---|
| 6,612,081 | B2* | 9/2003 | Cole | H02G 3/185 52/220.8 |
| 9,035,182 | B2* | 5/2015 | Scanzillo | H02G 3/088 174/67 |
| 9,490,616 | B1* | 11/2016 | Galasso | H02G 3/0412 |
| 2003/0106963 | A1 | 6/2003 | Smallhorn | |
| 2006/0052806 | A1* | 3/2006 | Xi | A46B 15/0032 606/161 |
| 2006/0283631 | A1 | 12/2006 | Drane | |
| 2008/0011503 | A1* | 1/2008 | Dinh | H02G 3/14 174/53 |
| 2008/0054135 | A1* | 3/2008 | Galasso | H02G 3/185 248/201 |
| 2008/0236859 | A1* | 10/2008 | de la Borbolla | H02G 3/14 174/66 |
| 2009/0194323 | A1* | 8/2009 | Jolly | H02G 3/0493 174/482 |
| 2010/0072198 | A1* | 3/2010 | Roemer | H02G 3/185 220/3.3 |
| 2013/0319715 | A1 | 12/2013 | Korcz et al. | |
| 2014/0000956 | A1* | 1/2014 | Wurms | H02G 3/08 174/535 |
| 2014/0090863 | A1 | 4/2014 | Korcz et al. | |
| 2014/0144667 | A1* | 5/2014 | DeBartolo, Jr. | H02G 3/185 174/67 |
| 2015/0071596 | A1* | 3/2015 | Elford | G02B 6/4441 385/135 |
| 2016/0269822 | A1* | 9/2016 | Gorial | H04R 1/345 |
| 2016/0308340 | A1 | 10/2016 | Scanzillo et al. | |
| 2017/0244230 | A1 | 8/2017 | Galasso et al. | |

* cited by examiner

RECESSED FLOOR FITTING AND COVERS THEREFORE

CROSS-REFERENCE TO RELATED APPLICATION

This application claims the benefit of U.S. Provisional Patent Application No. 62/711,867, filed Jul. 30, 2018, the entire contents of which are herein incorporated by reference.

FIELD

Various exemplary embodiments relate to recessed floor fittings to house any combination of electrical, data, communication, audio, and visual connections.

BACKGROUND

Different housings have been developed to house electrical, data, communication, audio, and visual connections recessed in a floor or a sub-floor. One example is a housing that extends into a concrete floor and includes a flange substantially flush with the floor level. A lid is connected to the housing to provide selective access by a user. Different combinations of electric, phone, data, and audio visual outlets are positioned in the housing so that a user can connect devices as needed. Openings can be provided in the lid so that cables can extend through the lid when in the closed position.

SUMMARY

In one embodiment, a recessed floor fitting for electrical connections including a poke-through housing, a divider assembly, and a feeder plate. The poke-through housing has a base and an outer wall with an open top that defines an interior chamber. The base includes a central aperture, a first perimeter aperture, and a second perimeter aperture. The divider assembly separates the interior chamber into a center portion, a first perimeter portion, and a second perimeter portion. The center portion is in communication with the center aperture. The first perimeter portion is in communication with the first perimeter aperture. The second perimeter portion is in communication with the second perimeter aperture. The feeder plate is connected to the base. The feeder plate has a mounting flange and a conduit extending from the mounting flange.

In another embodiment, a recessed floor fitting for electrical connections includes a poke-through housing, a divider assembly, a flange, a frame connected to the flange, a cover, and an access door. The poke-through housing has a base and an outer wall with an open top defining an interior chamber. The divider assembly separates the interior chamber into a center portion, a first perimeter portion, and a second perimeter portion. A flange is connected to the fitting. The flange having an outer edge and a recessed rim. The cover pivotally connected to the frame by a hinge assembly and moveable between a closed position and an open position. The access door pivotally connected to the cover and moveable between a first position and a second position. The access door is substantially flush with the cover in the first position. The access door at least partially extends in to the second chamber in the second position. The cover includes an opening for receiving a fastener to secure the cover in the closed position. The access door is secured in the first position and prevented from moving to the second position when the fastener secures the cover in the closed position.

In yet another embodiment, a recessed floor fitting for electrical connections include a poke-through housing, a divider assembly, a flange connected to the fitting, a primary cover releasably secured to the flange, and a secondary cover releasably secured to the primary cover over the central opening. The poke-through housing has a base and an outer wall with an open top defining an interior chamber. The divider assembly separates the interior chamber into a center portion, a first perimeter portion, and a second perimeter portion. The flange has an outer edge and a recessed rim extending around an upper opening. The primary cover includes a central opening. The secondary cover provides access to the central portion but not the first or second perimeter portions.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
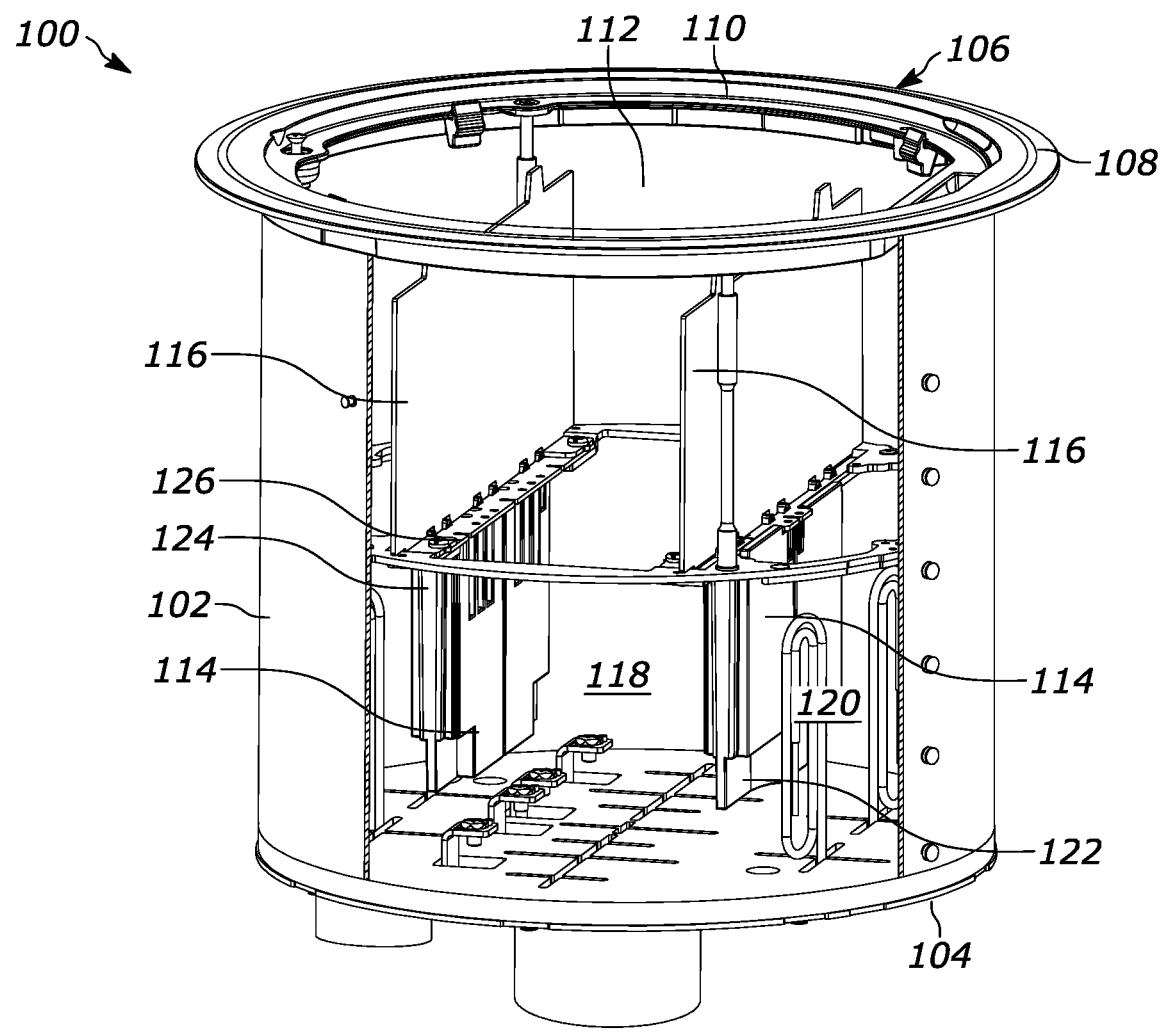
FIG. 1 is a cut-away, side perspective view of an exemplary fitting and flange.

FIG. 1 shows an exemplary recessed floor fitting 100 used to house different combinations of electrical, data, communication, audio, and visual connections. The illustrated embodiments are directed to recessed poke-through type housings. The housings may be between a 4-inch and a 20-inch, fire-rated recessed poke-through. The housings may also be between a 10-inch and a 16-inch, fire-rated recessed poke-through. More specifically, the housing may be a 10-inch, fire-rated recessed poke-through. The illustrated embodiments are directed to a circular, substantially circular, or obround housing, although in other embodiments, the housing may be triangular, rectangular, hexagonal, or any similar geometric shape. The illustrated embodiments may have an exposed area of between 0.5 square feet and 4 square feet. Other embodiments may have a larger or smaller exposed area. Different aspects described in this disclosure can be associated with other housings, including other types of poke-through housings and floor boxes.

FIG. 1 shows a fitting 100 having an outer wall 102 and a base 104 connected to a lower portion of the outer wall 102. The outer wall 102 has a substantially cylindrical configuration with an open top. In some embodiments, the outer wall 102 will have other rectilinear shapes, curvilinear shapes, or combinations thereof. A flange 106 is positioned above the outer wall 102. The flange 106 includes an outer edge 108 and a recessed rim no positioned below the outer edge 108. When the fitting 100 is installed into a floor, a majority of the outer wall 102 is positioned below the upper surface of the floor and the flange 106 is positioned at or slightly above floor level. The position of the flange 106 relative to the outer wall 102 can be adjusted based on the thickness of a floor covering so the flange 106 rests on-top of the floor covering. For example, carpet, wood, or tile can be positioned on a concrete floor and the flange 106 is positioned to rest on top of the covering.

Figure 2:
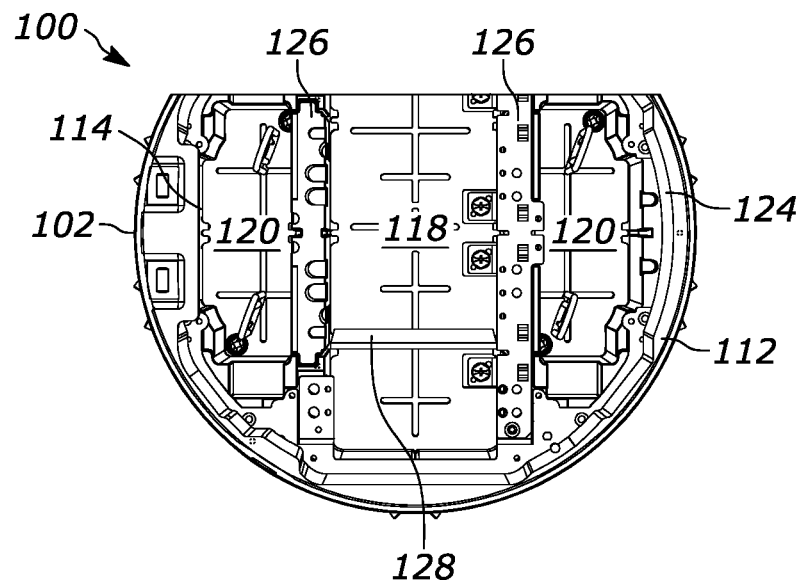
FIG. 2 is a partial, top view of FIG. 1 with the flange and upper dividers removed.

The outer wall 102 and the base 104 define an interior compartment that can have different configurations as required by the user. As shown in FIGS. 1 and 2, in some embodiments the interior compartment includes an inner wall 112 that extends around the interior compartment adjacent the outer wall 102. The height of the inner wall 112 can extend substantially the height of the outer wall 102, or a portion thereof. The inner wall 112 can include an intumescent material that expands in response to heat. The intumescent material is used as a fire protectant to retard the spread of fire or heat through the fitting. Less or no intumescent material can be used depending on the fire rating requirements of the fitting 100. The inner wall 112 can be formed as a single piece or two or more pieces. Different mounting features can be included in the inner wall to connect other components. These mounting features can include openings, threads, bosses, surface features (e.g. projections, depressions), or other connection components.

Dividers are used to separate different portions of the interior chamber. The exemplary embodiment shows a set of lower dividers 114 and a set of upper dividers 116 that separate the interior chamber into a center portion 118 and a pair of perimeter portions 120. The lower dividers 114 can include an intumescent material and be formed as a single piece or two or more pieces. Less or no intumescent material can be used depending on the fire rating requirements of the fitting. Portions of the lower dividers 114 can include one or more knock-out sections 122 that allow conductors and conduits to pass through the lower dividers 114. The knock-outs 122 can be positioned at either ends of the lower dividers 114. The upper dividers 116 are positioned above the lower dividers 114. The upper dividers 116 can be made from a different material than the lower dividers 114, such as metal. A ring 124 extends at least partially around the interior chamber and can include a pair of mounting bars 126 that are connected to, or integrally formed with, the ring 124. An outer portion of the ring 124 can be connected to the inner wall 112 and the lower dividers 114 and the upper dividers 116 can be connected to the mounting bars 126.

The lower and upper dividers 114, 116 separate the center portion 118 from the pair of perimeter portions 120. Separating the interior can isolate high voltage components and connections (e.g. electrical power wiring and outlets) from low voltage components and connections (e.g. data, audio visual, communication wiring, and outlets). In an exemplary embodiment, the center portion 118 can include four full gang connections and the perimeter portions 120 can include one full gang or two half gangs each. As shown in FIG. 2, secondary dividers 128 can be used to divide the center portion 118 into different compartments to further breakdown and isolate different connections. The secondary dividers 128 extend across the central portion 118 and are connected to the mounting bars 126.

Figure 3:
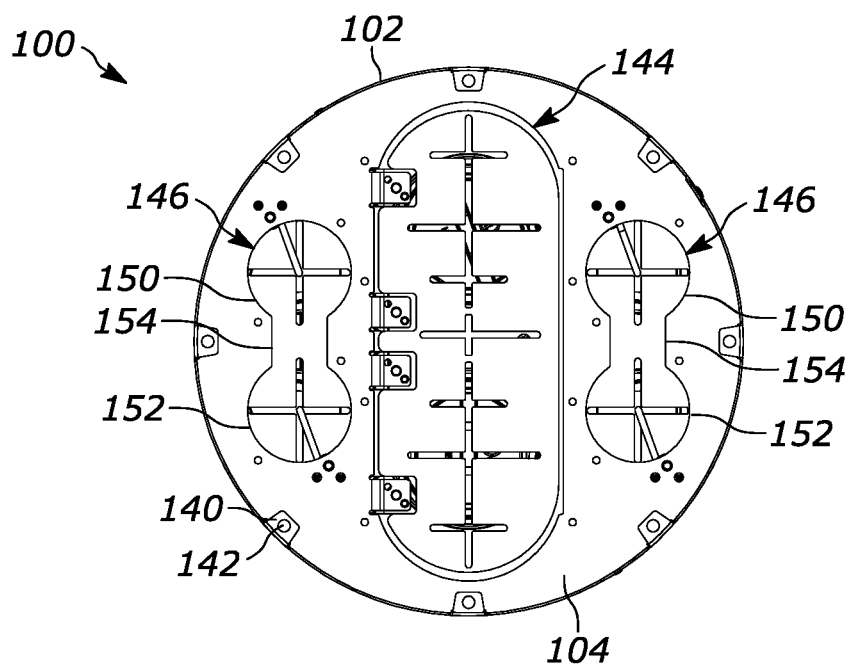
FIG. 3 is a bottom view of FIG. 2.

FIG. 3 shows and exemplary base 104 of the fitting 100 connected to the outer wall 102 by a set of tabs 140 and fasteners 142. In some embodiments the base 104 can be connected through other fasteners, a joining process (e.g. welding), or it can be integrally formed with the outer wall 102. The base 102 includes one or more apertures for different conductor paths. In the illustrated embodiment, the base includes a center aperture 144 aligned with the center portion 118 of the interior and a pair of perimeter apertures 146 aligned with respective perimeter portions 120 of the interior. The center aperture 144 has a substantially obround configuration, although other shapes and sizes can be used. Each of the perimeter apertures 146 includes a first circular portion 150, a second circular portion 152, and a passage 154 connecting the two. Feeder plates can be connected to the base to provide separate conduits for different conductors or for different types of conductors. For example, high voltage conductors can be routed through separate feeder plate conduits than low voltage conductors. Threaded holes are provided around the center aperture 144 and the perimeter apertures 146 to connect the feeder plates using fasteners. Other mounting components and connections can also be used.

Figure 4:
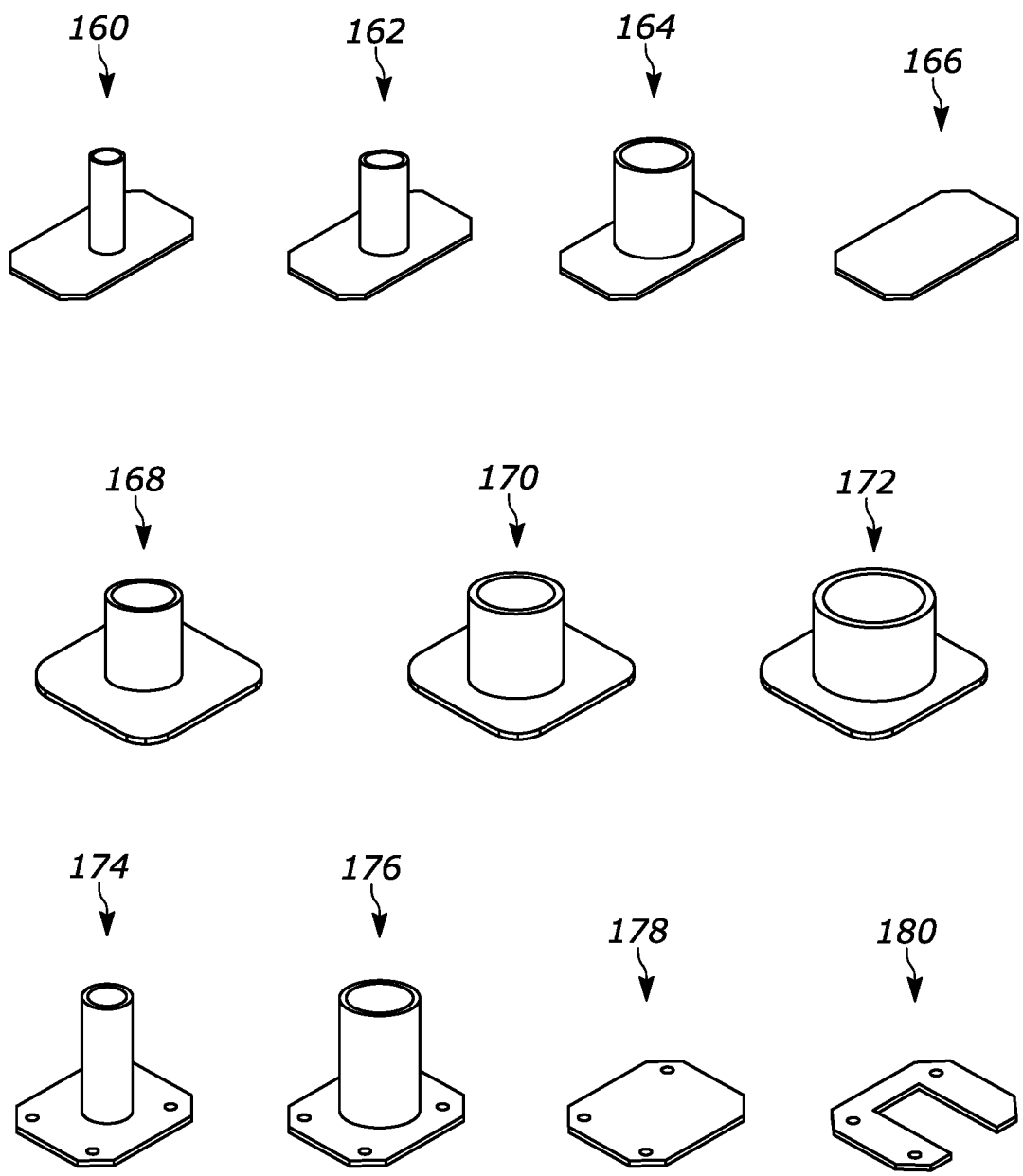
FIG. 4 is a perspective view of a variety of feeder plates for use with the fitting.

The feeder plates can include a flange that connects to the base 104 and a conduit extending from the flange to receive one or more conductors. In addition to conduits, blank plates can be used to close off an aperture and pass-through plates can be used where separation by an extending conduit is not needed. FIG. 4 shows exemplary feeder plates that can be connected to the base. The illustrated feeder plates are electric metal tubing (EMT) and the sizes are given as the trade designation with the metric designator given in parenthesis. These designations and sizes would be understood by one of ordinary skill in the art. The first set is configured as single-gang center mounts and include a half-inch (16) feed 160, a three-quarter-inch (21) feed 162, a one-inch (27) feed (not shown), an inch-and-a-quarter (35) feed 164, a blank plate 166, and a pass-through plate 167 (see e.g., FIG. 5). The second set is configured as two-gang center mounts and includes a one-and-a-half-inch (41) feed 168, a two-inch (53) feed 170, and a two-and-a-half-inch (63) feed 172. The third set is configured as half-gang perimeter mounts and includes a half-inch (16) feed 174, a three-quarter-inch (21) feed (not shown), a one-inch (27) feed 176, an inch-and-a-quarter (35) feed (not shown), a blank plate 178, and a pass-through plate 180.

Figure 5:
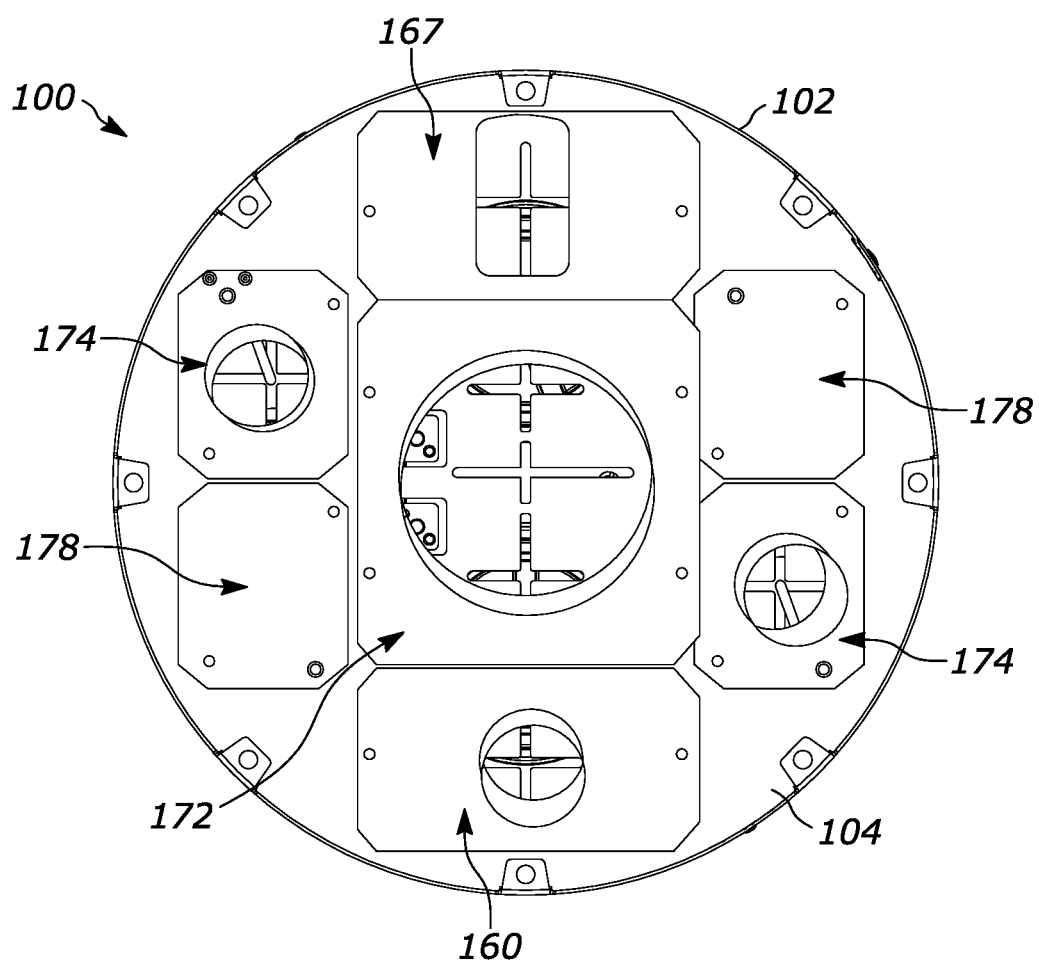
FIG. 5 is a bottom view of the fitting with an exemplary feeder plate configuration attached.
Figure 6:
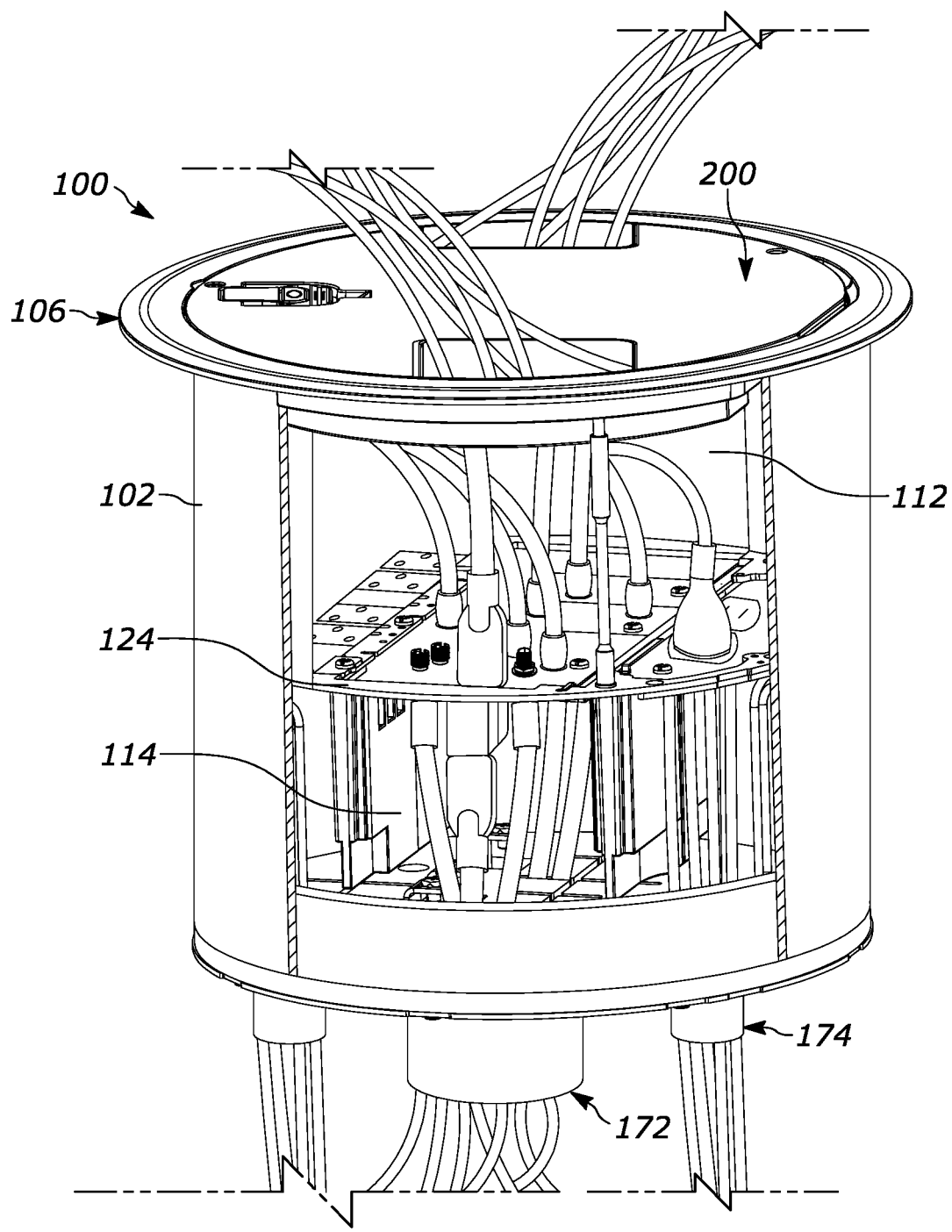
FIG. 6 is a cut-away, side perspective view of the fitting with conductors installed and device cables attached to outlets in the fitting.

FIG. 5 shows an exemplary configuration of feeder plates connected to the base, including two perimeter half-inch feeders 174, two perimeter blanks 178, a center pass through 167, a center two-and-a-half-inch feeder 172, and a center half-inch feeder 160. The ability to scale the openings from half-inch to two-and-a-half-inch provides greater flexibility than previous fittings. The two-and-a-half-inch feeder is a larger size than what has been available, and allows an installer to more easily run a series of low-voltage connectorized cables to the center portion. FIG. 6 shows the fitting 100 with conductors installed and a number of devices plugged into outlets installed in the fitting 100.

Figure 7:
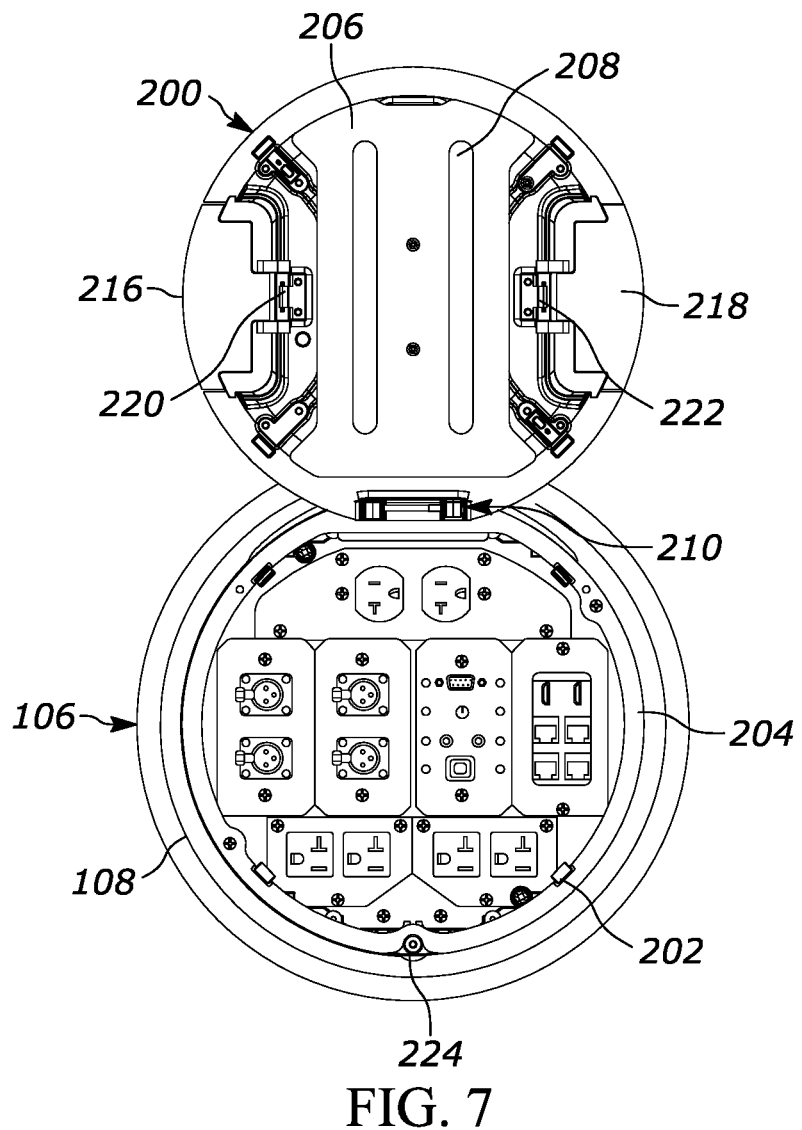
FIG. 7 is a top view of the fitting with exemplary outlets installed and a recessed cover attached and in an open position.
Figure 8:
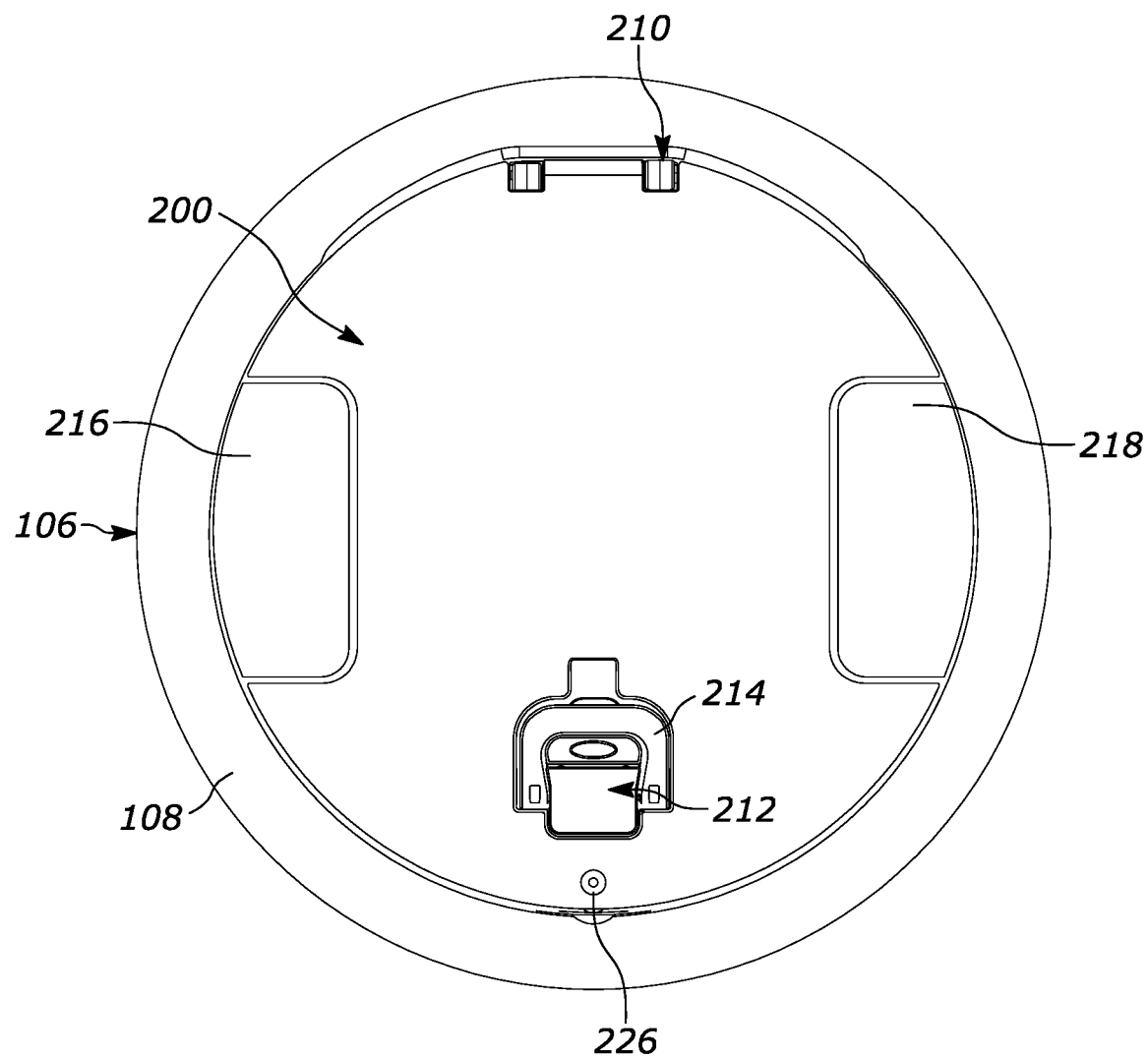
FIG. 8 is a top view of the fitting with a recessed cover attached and in a closed position.

As shown in FIGS. 6-8, a recessed cover 200 can be pivotally connected to the fitting 100 to provide a closure for the interior chamber. In an exemplary embodiment the cover 200 is pivotally connected to a frame 202 that is secured to the recessed rim no of the flange 106. The frame 202 defines a substantially circular opening that provides access to the interior compartment. A gasket 204 can be positioned between the frame 202 and the cover 200 to provide water resistance (e.g. scrub water protection) for the interior chamber. A retaining plate 206 is secured to the bottom side of the cover. The retaining plate 206 is used to secure intumescent material 208 to cover. The recessed cover 200 may include brushed aluminum, a black powder coat, brass plated, bronze plated, nickel-plated, a gray powder coat, or any other suitable material or coating.

The cover 200 is pivotally connected to the frame 202 by a hinge assembly 210. The hinge assembly 210 can include a first hinge member and a second hinge member, allowing the cover 200 to pivot 180 degrees with respect to the frame 202 and have a substantially flat orientation when open. A latch assembly 212 is used to releasably secure the cover 200 in the closed position. The cover 200 can be latched in the closed position, as shown in FIG. 8, by pushing downwardly on the cover 200. The latch assembly 212 may engage the flange 106 in the closed position to releasably secure the cover. The cover 200 can be easily opened by pulling upwardly on the latch handle 214. Pulling on the latch handle 214 causes the latch assembly to disengage (e.g., from the flange 106) in order to allow the cover 200 to move. The handle 214 rests in a recess in the cover 200, enabling the handle 214 to lie substantially flush with the top surface of the cover 200. The handle 214 may move (e.g., pivot) out of the recess when a user pulls on the handle 214.

The cover includes a first access door 216 and a second access door 218 that allow cables to extend through the cover 200 while it is in the closed position. The access doors 216, 218 are secured on opposing sides of the cover 200 and are substantially flush with the top surface of the cover 200 in their closed positions. The access doors 216, 218 are secured to the cover 200 by respective hinges 220, 222 fastened directly to the underside of the cover 200. The hinges 220, 222 enable the access doors 216, 218 to pivot downwardly and inwardly below the cover 200, providing readily available access to electrical cables receivable in electrical outlets in the interior compartment, and so that cables from equipment can remain plugged in to outlets while the cover 200 remains closed for aesthetic and safety reasons.

When the cover 200 and the access doors 216, 218 are in the closed position the access doors 216, 218 and the cover 200 rest on the frame 202 and/or the gasket 204 positioned on the frame 202. Accordingly, to open the access doors 216, 218 the cover 200 first needs to be opened with the latch handle 214. In certain instances, it can be desirable to limit or prevent unauthorized access to the interior compartment of the fitting 100. For example, a recessed poke-through can be positioned in the floor of an airport to provide power or communication outlet access to employees at certain locations where typical wall outlets are not easily accessible. The airport, however, may want to prevent unauthorized access or use of the poke-through.

According to an exemplary embodiment, the cover 200 can include a tamper resistant feature that helps prevent unauthorized access to the interior compartment. The frame 202 can include an opening 224 (FIG. 7) for receiving a fastener 226 that extends through the cover 200 (FIG. 8) and the frame 202 to threadably connect to the flange 106, the fitting 100, a component positioned in the fitting 100 (e.g. the inner wall 112), or any combination thereof. The fastener 226 can be a standard fastener or a tamper-resistant fasteners can be used. Tamper-resistant fasteners utilize uncommon bolt heads that cannot be removed with standard screwdrivers or hex wrenches. This helps prevent access as members of the general public do not carry around the tools necessary to remove the fastener. In some cases standard fasteners are sufficient to deter use. When secured in the closed position by the fastener 226, the cover 200 cannot be raised or the access doors 216, 218 opened.

Figure 9:
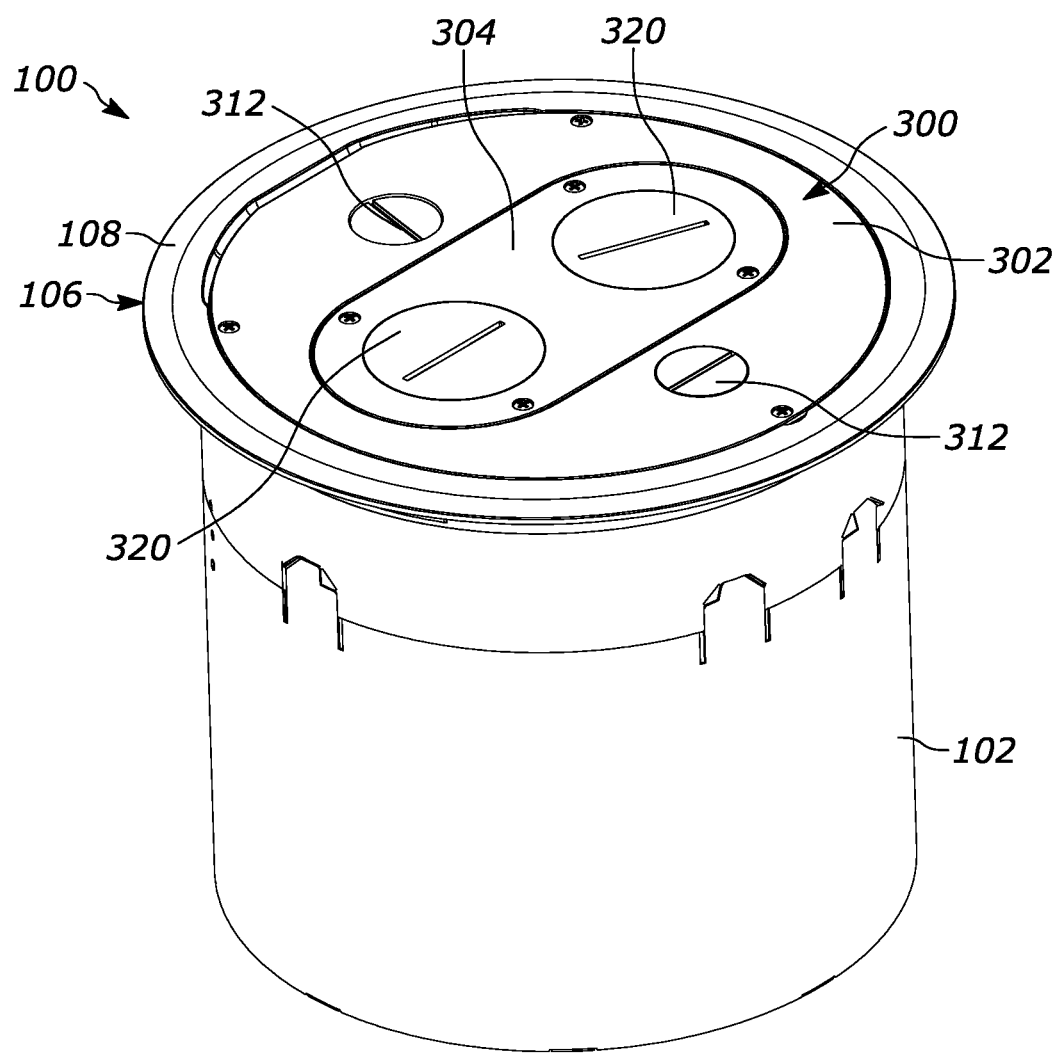
FIG. 9 is a perspective view of the fitting with a furniture feed cover attached.
Figure 10:
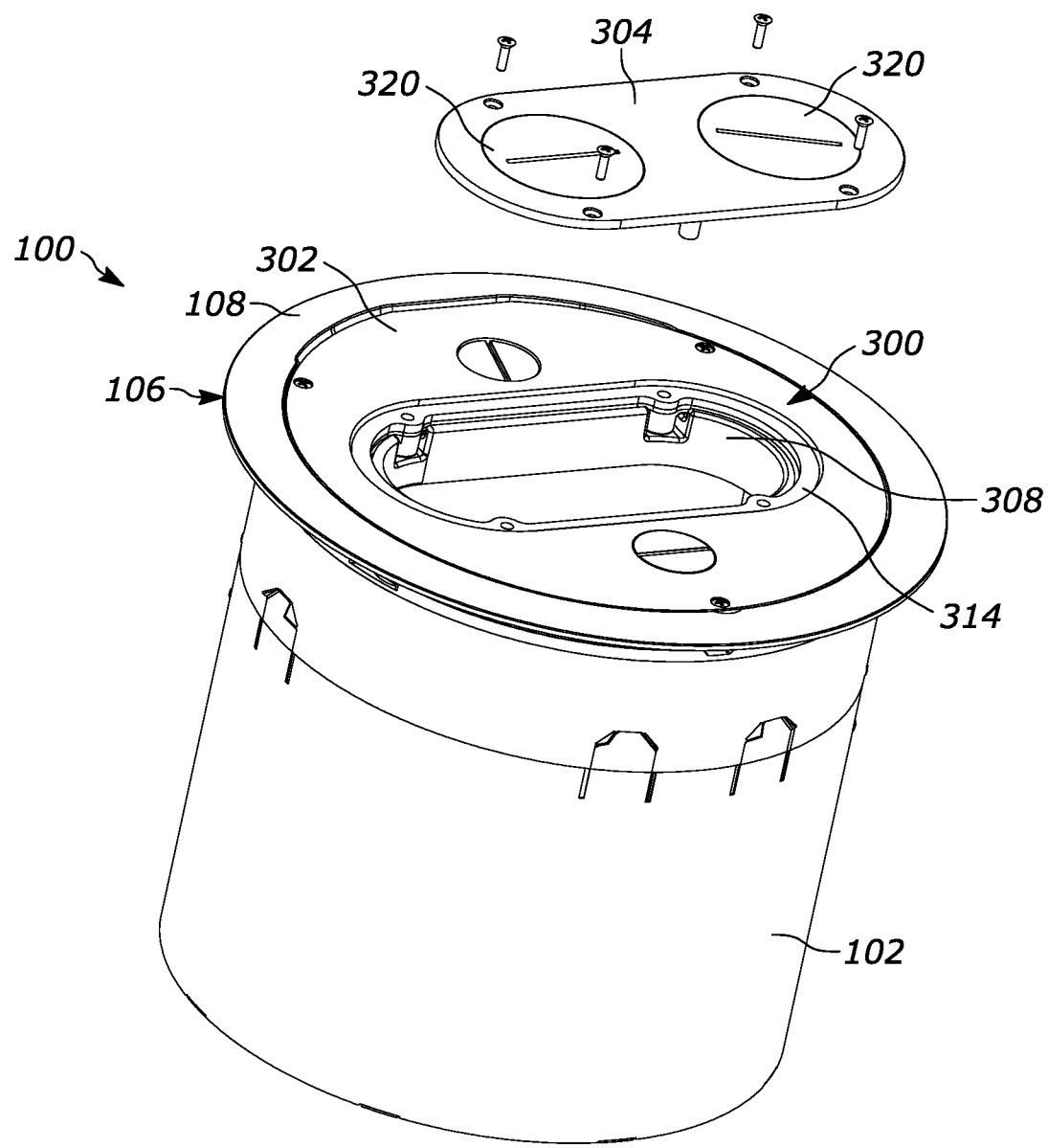
FIG. 10 is a perspective view of FIG. 9 with the secondary cover removed.
Figure 11:
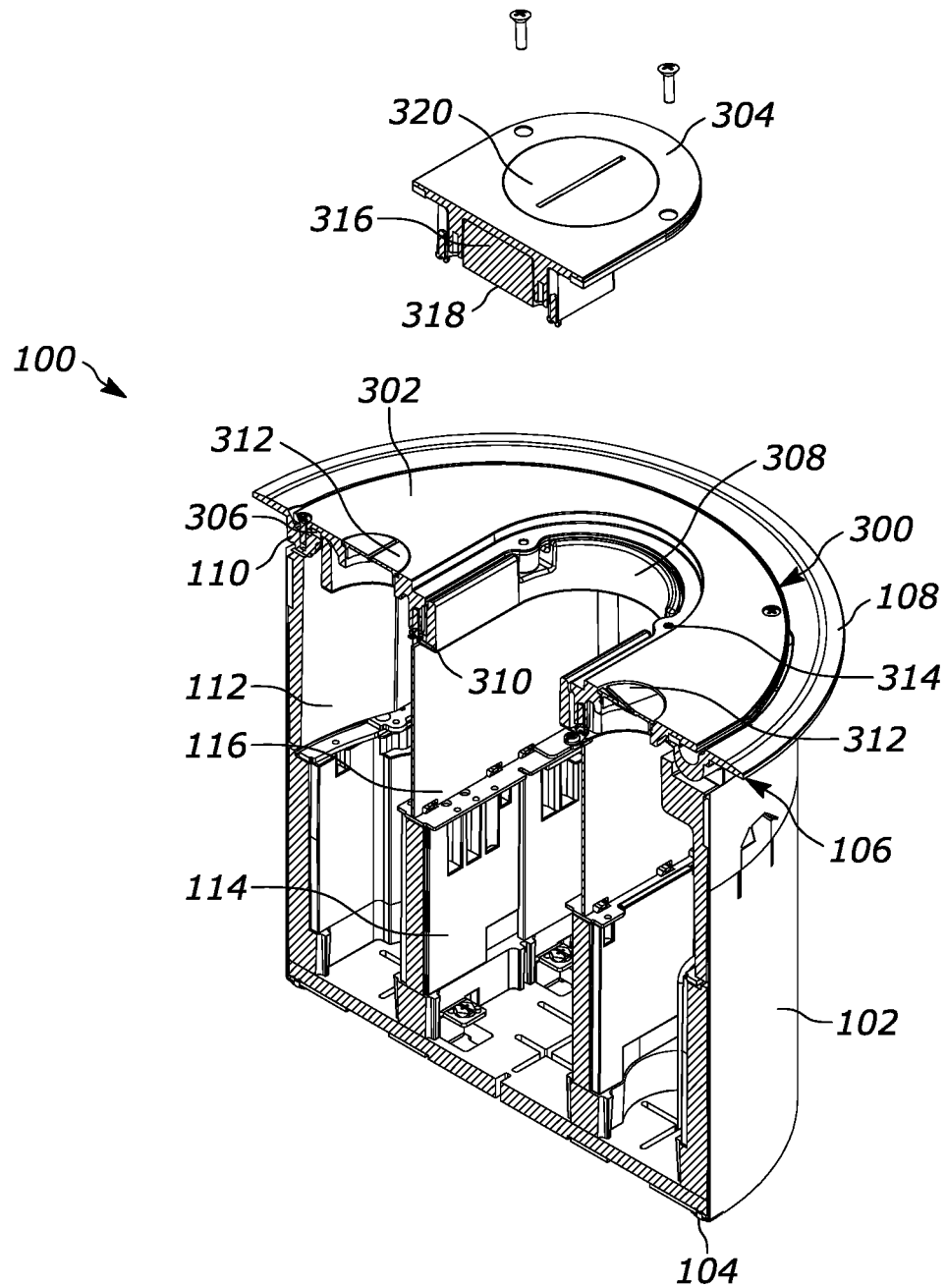
FIG. 11 is a sectional, perspective view of FIG. 10.

FIGS. 9-11 show an exemplary embodiment of a furniture feed cover 300 that can be connected to the fitting 100 and the flange 106 instead of a recessed cover 200. The furniture feed cover 300 is used to run cabling through the fitting to a piece of furniture that has built in outlets, such as a desk, cubical, or conference table. The furniture feed cover 300 includes a primary cover 302 and a secondary cover 304. Both the primary cover 302 and the secondary cover 304 have an upper surface that lies substantially flush with the upper surface of the flange 106. The furniture feed cover 300 may include different materials and surface coatings.

The primary cover 302 is secured to the flange 106 by a set of fasteners. The fasteners extend through openings positioned around the perimeter of the primary cover 302. A gasket 306 can be positioned between the primary cover 302 and the recessed rim no of the flange 106 to help prevent liquid and debris from entering the interior chamber. As best shown in FIGS. 10 and 11, intumescent material 308 can be secured to the interior side of the primary cover 302 using a retaining plate 310 and one or more fasteners.

A pair of perimeter plugs 312 are threadably connected to the primary cover 302. The perimeter plugs 312 are positioned on opposite sides of the primary cover 302 and are positioned over a respective perimeter portion 120 of the interior chamber. The perimeter plugs 312 can be removed so that a conduit is connected to the threaded opening in the primary cover 302 and cables can be routed through the openings.

The secondary cover 304 is releasably secured to the primary cover 302 by one or more fasteners. A seal 314 can be positioned between the primary cover 302 and the secondary cover 304 to help prevent liquid and debris from entering the interior chamber. As best shown in FIG. 11, intumescent material 316 can be secured to the interior side of the secondary cover 304 using a retaining plate 318 and one or more fasteners. The secondary cover 304 has a substantially obround shape that aligns with the central portion 118 of the interior chamber. The size, shape, and position of the secondary cover 304 can be dependent on the position of the central portion 118 and the overall fitting 100.

A pair of central plugs 320 are threadably connected to the secondary cover 304. The central plugs 320 are positioned on opposite ends of the secondary cover 304. The central plugs 320 can be removed so that a conduit is connected to the threaded openings in the secondary cover 304 and cables can be routed through the openings.

According to various exemplary embodiments, the high voltage cables are routed through the primary cover 302 while low voltage cables are routed through the secondary cover 304. The primary cover 302 aligns with and/or receives portions of the upper dividers 116 so that the secondary cover 304 provides access to the central portion 118 of the interior chamber without exposing a user to the perimeter portions 120 of the interior. This can allow a user to install or access low voltage components without worry of danger from high voltage components.

Figure 12:
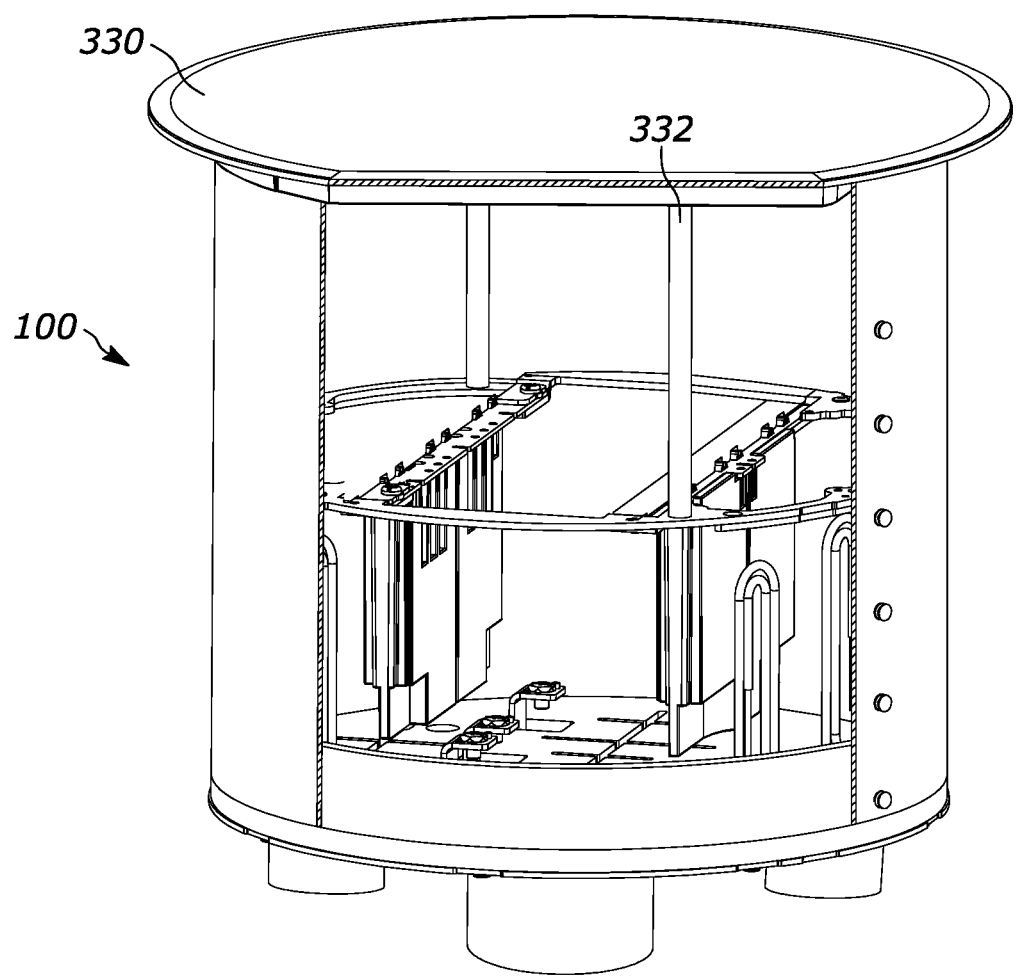
FIG. 12 is a cut-away, side perspective view of the fitting with a connected installation cover.
Figure 13:
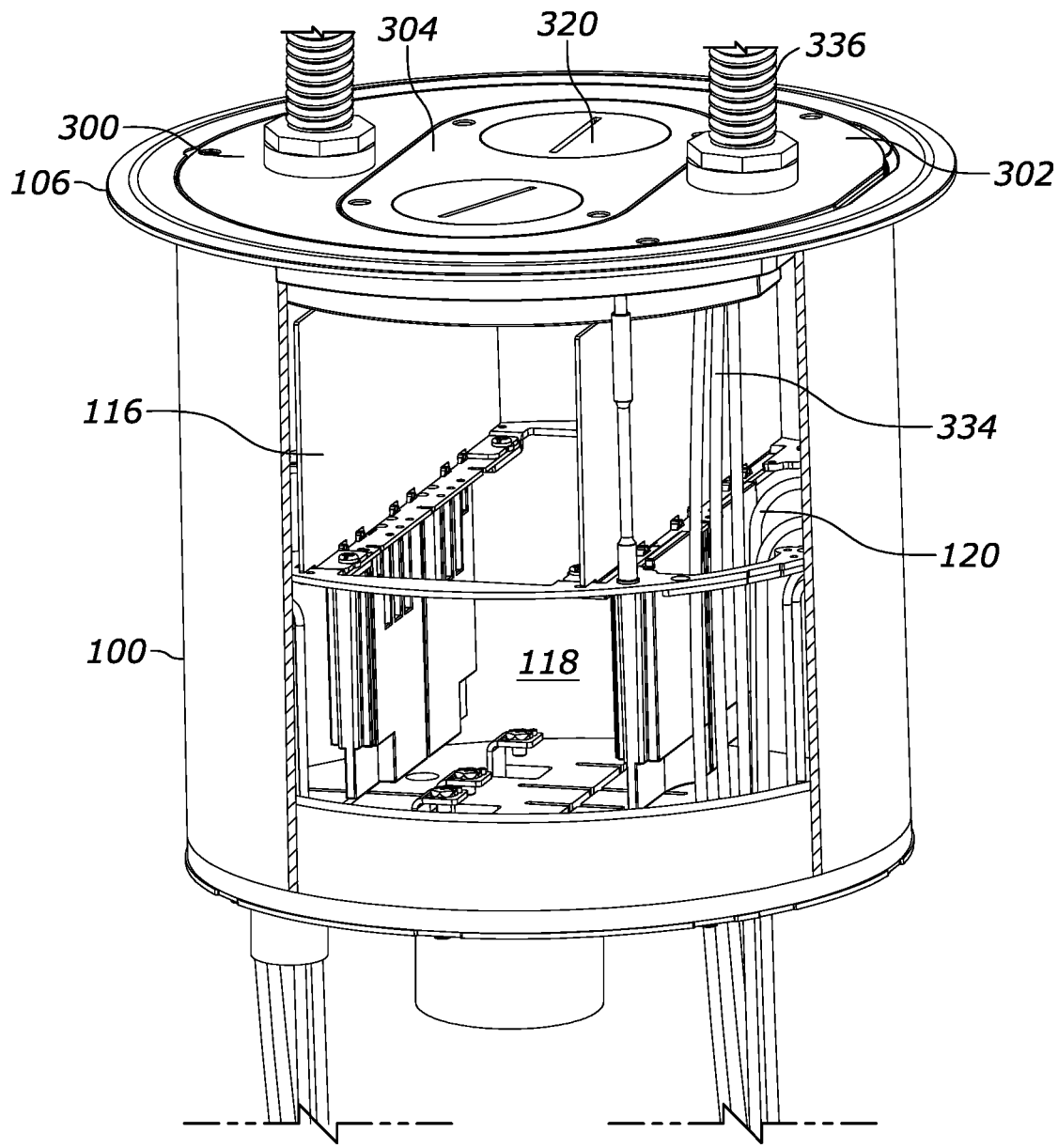
FIG. 13 is a cut-away, side perspective view as in FIG. 12 and with a furniture feed cover, high voltage conductors, and perimeter conduits installed.

During installation of the furniture feed cover 300, a user can first install the fitting 100 in a recessed opening in a floor, as shown in FIG. 12. The fitting 100 can initially include an installation cover 330 and spacers 332 provided for support and protection during shipping and initial installation. The installation cover 330 and spacers 332 can be removed after the fitting 100 is placed. The upper dividers 116 and the flange 106 can be the connected to the fitting as shown in FIG. 1. High voltage wiring 334 can be run through the perimeter portions 120 of the fitting 100 prior to, or after, installation in the floor. The perimeter plugs 312 can be removed as needed and conduits 336 (e.g. liquid tight conduits) are connected to the primary cover 302 as shown in FIG. 13. The high voltage wiring 334 is run through the perimeter conduits 336 to the necessary furniture connection. The furniture feed cover 300 can be connected to the flange 106 prior to or after installing the perimeter conduits 336 and running the high voltage wiring 334.

Figure 14:
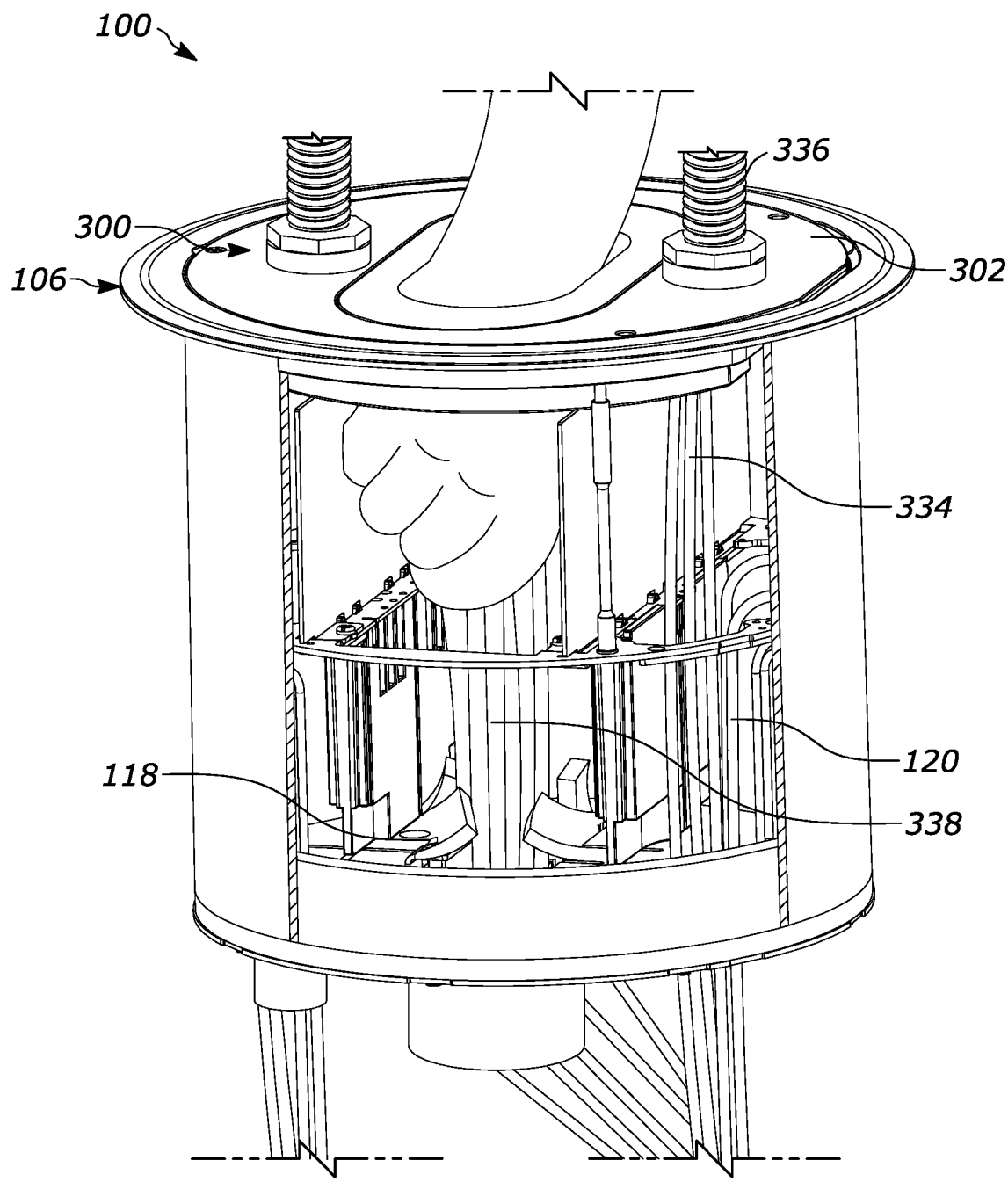
FIG. 14 is a cut-away, side perspective view as in FIG. 13 and showing a user installing low voltage conductors.
Figure 15:
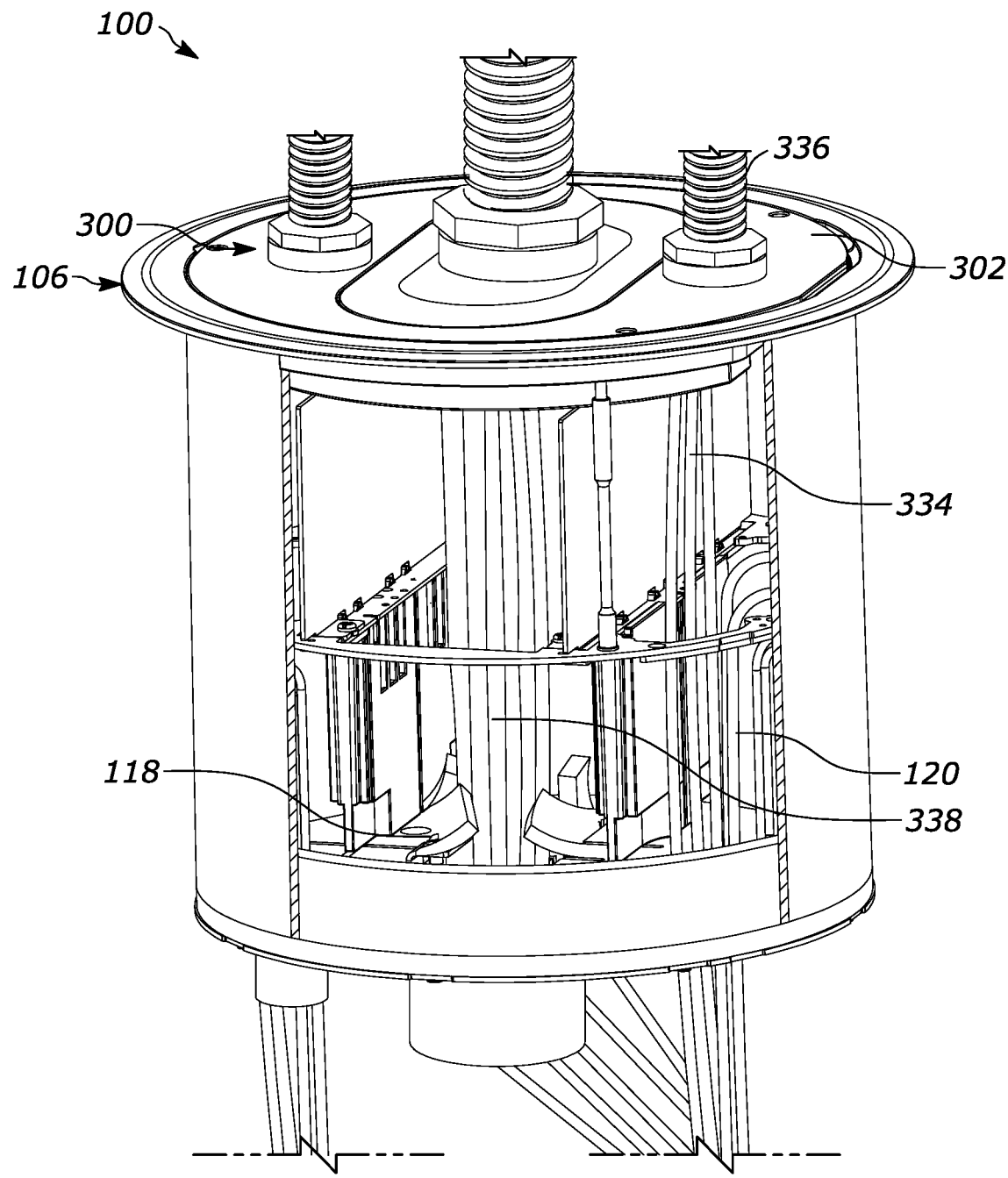
FIG. 15 is a cut-away, side perspective view as in FIG. 14 with low voltage cables and a central conduit installed.

If needed, the secondary cover 304 can be removed so that low voltage cables 338 can be routed through the central portion as shown in FIG. 14. The central portion 120 and the secondary opening are configured so that a user can reach their hand in without removal of the primary cover 302. The central plugs 320 can be removed as needed and conduits 340 (e.g. liquid tight conduits) are connected to the secondary cover as shown in FIG. 15. The low voltage wiring 338 is run through the central conduits 340 to the necessary furniture connection.

As shown in FIG. 14, the dividers 114, 116 isolate the perimeter portions 120 so that there is no danger to the user from the high voltage components. This eliminates the need for a licensed electrician to run the low voltage components, as there is no exposure to high voltage connections or components. Accordingly, an electrician can install the fitting, make the required high voltage connections, and install the furniture feed cover 300 and another user, such as an IT professional, can later install the necessary data, communication, and audio/visual connections.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A recessed floor fitting for electrical connections comprising:
   a recessed housing having a base and an outer wall with an open top defining an interior chamber;
   a divider assembly separating the interior chamber into a center portion, a first perimeter portion, and a second perimeter portion, the divider assembly including a pair of lower dividers and an upper divider, wherein the upper dividers are made from a different material than the lower dividers;
   a flange connected to the fitting, the flange having an outer edge and a recessed rim;
   a frame connected to the flange;
   a cover pivotally connected to the frame by a hinge assembly and moveable between a closed position and an open position; and
   an access door pivotally connected to the cover and moveable between a first position where the access door is substantially flush with the cover and a second position where the access door at least partially extends in to the interior chamber,
   wherein the cover includes an opening for receiving a fastener to secure the cover in the closed position,
   wherein the access door is secured in the first position and prevented from moving to the second position when the fastener secures the cover in the closed position, and
   wherein the access door at least partially extends into the center portion in the second position.

2. The recessed floor fitting of claim 1, wherein the fastener is a tamper-resistant fastener.

3. The recessed floor fitting of claim 1, further comprising a latch handle movable relative to the cover.

4. The recessed floor fitting of claim 1, further comprising a latch assembly used to releasably secure the cover in the closed position.

5. A recessed floor fitting for electrical connections comprising:
   a recessed housing having a base and an outer wall with an open top defining an interior chamber;
   a divider assembly separating the interior chamber into a center portion, a first perimeter portion, and a second perimeter portion, wherein the center portion is positioned between the first perimeter portion and the second perimeter portion;
   a flange connected to the fitting, the flange having an outer edge and a recessed rim;
   a frame connected to the flange;
   a cover pivotally connected to the frame by a hinge assembly and moveable between a closed position and an open position; and
   an access door pivotally connected to the cover and moveable between a first position where the access door is substantially flush with the cover and a second position where the access door at least partially extends in to the interior chamber,
   wherein the cover includes an opening for receiving a fastener to secure the cover in the closed position,
   wherein the access door is secured in the first position and prevented from moving to the second position when the fastener secures the cover in the closed position, and wherein the access door at least partially extends into the center portion in the second position.

6. The recessed floor fitting of claim 5, wherein the fastener is a tamper resistant fastener.

7. The recessed floor fitting of claim 6, wherein the access door is secured in the first position and prevented from moving to the second position when the fastener secures the cover in the closed position.

8. The recessed floor fitting of claim 5, further comprising a latch handle moveable relative to the cover.

9. The recessed floor fitting of claim 5, wherein the central portion is isolated from the first perimeter portion and the second perimeter portion.

10. The recessed floor fitting of claim 5, further comprising a gasket between the frame and the cover.

11. The recessed floor fitting of claim 5, further comprising a retaining plate to secure intumescent material in the floor fitting.

12. The recessed floor fitting of claim 11, wherein the retaining plate is secured to a bottom side of the cover.

13. A recessed floor fitting for electrical connections comprising:
- a recessed housing having a base and an outer wall with an open top defining an interior chamber;
- a divider assembly separating the interior chamber into a center portion, a first perimeter portion, and a second perimeter portion, the divider assembly including a pair of lower dividers and a pair of upper dividers releasably connected to the lower dividers and extending between the lower dividers and the cover, wherein the upper dividers are made from a different material than the lower dividers;
- a flange connected to the fitting, the flange having an outer edge and a recessed rim;
- a frame connected to the flange;
- a cover pivotally connected to the frame by a hinge assembly and moveable between a closed position and an open position; and
- an access door pivotally connected to the cover and moveable between a first position where the access door is substantially flush with the cover and a second position where the access door at least partially extends into the interior chamber.

14. The floor fitting of claim 13, wherein the hinge assembly includes a first hinge and a second hinge.

15. The floor fitting of claim 14, wherein the first hinge and second hinge are configured to allow the cover to pivot 180 degrees and have a substantially flat orientation in the open position.

16. The floor fitting of claim 13, further comprising a latch assembly to releasably secure the cover in a closed position.

17. The floor fitting of claim 16, wherein the latch assembly further comprises a latch handle movable relative to the cover, wherein the latch handle lies in a recess in the cover as is configured to be flush with a top surface of the cover.

18. The floor fitting of claim 13, wherein the access door is a first access door, and a second access door is pivotally connected to the cover.

19. The floor fitting of claim 1, wherein the upper dividers extend between the lower dividers and the cover.

* * * * *